Nov. 3, 1942.  V. S. FOX ET AL  2,301,114
OPTICAL PROJECTOR
Filed March 20, 1940
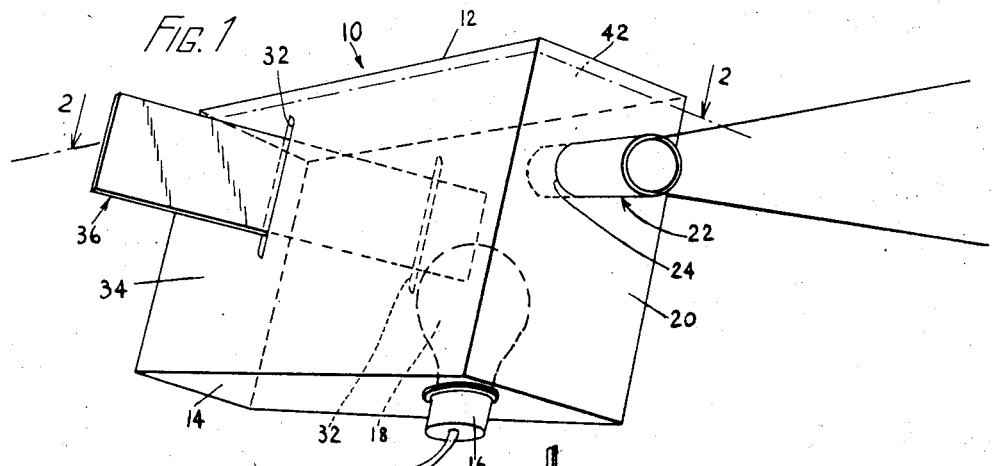
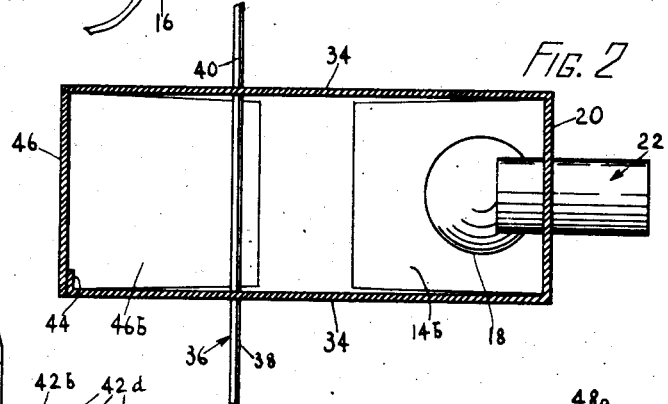
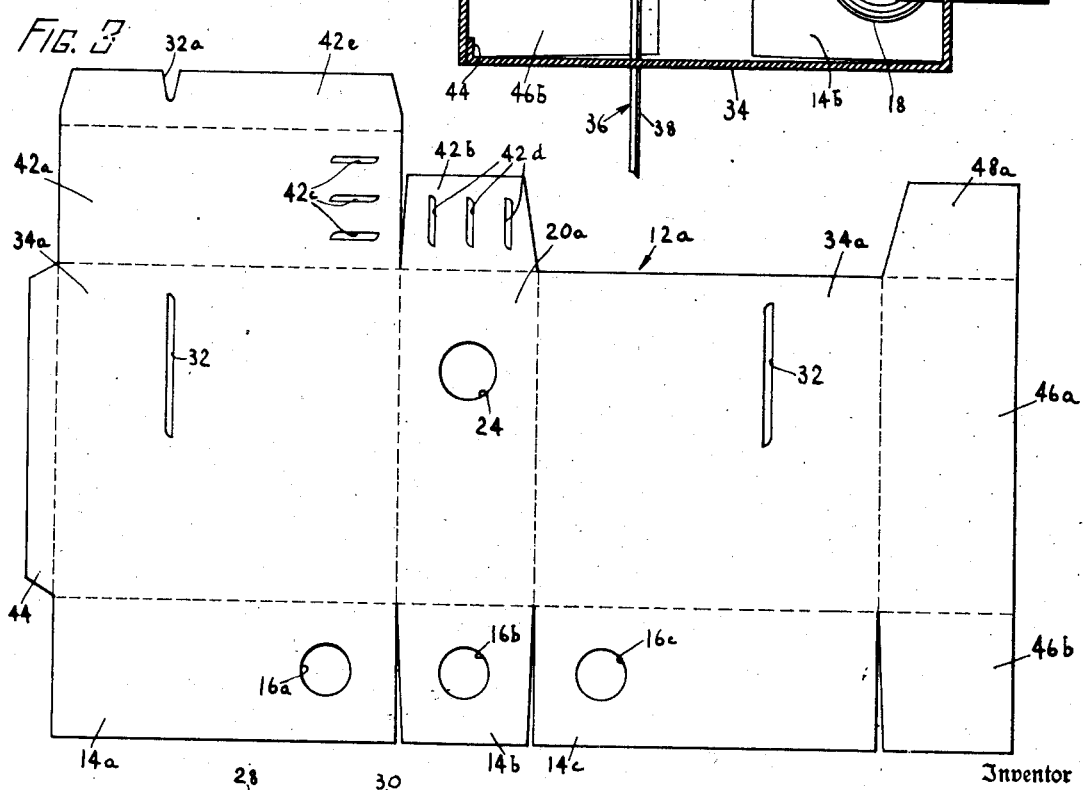
Inventor
VICTOR S. FOX and ROBERT W. FARRELL
By
Attorney Patented Nov. 3, 1942

2,301,114

UNITED STATES PATENT OFFICE 2,301,114

OPTICAL PROJECTOR

Victor S. Fox, New York, and Robert W. Farrell, Bronx, N. Y., assignors, by mesne assignments, to said Farrell Application March 20, 1940, Serial No. 324,982

5 Claims. (Cl. 88—26)

This invention relates to optical projectors.

It is an object of the present invention to provide an optical projector which is easy and inexpensive to construct and which can be readily assembled by children or others from initially separate parts. More particularly, in accordance with the present invention the housing of the projector can be formed from cardboard or other suitable sheet material from a preformed blank having relatively foldable parts and designed to be easily formed into a box or similar container to constitute the housing of the projector. The box or said blank for forming the same includes openings or cutouts or opening defining parts for mounting a lens barrel or tube therein, for mounting a lamp socket, and for providing a guide passage for the object slide.

Further, it is an object of the present invention to provide an optical projection in which the slide carrying the object or subject matter to be projected can be constituted by paper or similar sheet material of indeterminate length. More particularly, pursuant to this object of the invention the slide can be constituted by comic or other strip material such as that printed in newspapers or magazines or other publications, whereby the operator of the projector has available at little or no cost a large and wide variety of subjects. Another object of the invention in this connection is to provide a projector having the lamp or other source of illumination arranged so that the light therefrom is reflected by the paper or other strip material carrying the object to be projected, whereby the strip material can be mounted on a backing or stiffening strip which can be opaque if desired.

Another object of the invention is to provide a lens tube of simple and inexpensive construction and constructed and arranged to hold a magnifying lens therein, the parts being capable of being easily assembled in respect to each other and with the housing of the projector.

The above objects of the invention and other objects which might hereinafter appear will be fully understood from the following description considered with reference to the accompanying drawing which illustrates a preferred embodiment of the invention.

In the drawing:

Fig. 1 is a perspective view of a projector embodying the present invention;

Fig. 2 is a sectional view on the line 2—2 of Fig. 1;

Fig. 3 is a plan view of the blank from which the projector housing is formed;

Fig. 4 is a longitudinal sectional view of the lens tube.

Reference being had to the drawing in detail it will be seen that the projector 10 embodying the present invention comprises a housing 12 having mounted on the bottom wall 14 thereof a lamp socket 16 for a lamp 18 which is to be positioned in said housing preferably near the front wall 20 thereof. A lens tube 22 is provided in the front wall 20 of said housing and projects adjustably and removably through an opening 24 in said wall. A convex or magnifying lens 26 is disposed in tube 22, being held in position centrally of said tube by tubular retaining members 28 and 30 which snugly engage the inner surface of tube 22 in slidable relation thereto and grip between their adjacent ends the marginal peripheral edge of the lens, as illustrated in Fig. 4.

Aligned slots 32 are provided in the opposite side walls 34 of housing 12 for the passage through the housing of an object slide 36 in such position that light from lamp 18 reflected from the surface of said slide is projected through lens tube 22. As hereinbefore stated, slide 36 is preferably constituted by sheet material such as newspaper carrying printed matter, for example, comic strip material, adventure material, or the like, although, of course, any suitable subject to be projected can be utilized on the slide. The newspaper strip material is indicated by way of example at 38 and is preferably mounted on a backing strip 40 which, if desired, can also be somewhat flexible so that the entire length of slide material can be formed into a roll or optionally as individual strips of any suitable length. Slide 36 can be opaque since the lamp or source of light 18 for illuminating said slide is mounted in the housing in front of the slide, the light on the object being reflected through the magnifying lens 26. In using the projector the slide is passed through the housing in inverted relation so that the projected image is upright when viewed on a screen.

Housing 12 is formed from a blank of cardboard or other suitable sheet material, said blank being indicated at 12a in Fig. 3. By reference thereto it will be observed that said blank comprises relatively foldable parts, the lines of fold being indicated by dotted lines on the drawing. The part 20a which forms the front wall 20 of the housing is formed with the opening 24 into which the lens tube 22 is to be inserted. The parts 14a, 14b and 14c which form the bottom 14 of housing 12 are provided with circular openings 16a, 16b and 16c, respectively, which are in alignment with each other when the blank is folded to form the housing and which, therefore, provide an opening in bottom wall 14 for the projection adjustably therethrough of lamp socket 16. It will be understood that the lens tube 22 and the socket 16 are designed to snugly fit adjustably and removably within their respective openings in the housing. Socket 16 thus holds the parts 14a, 14b and 14c in folded condition. The slots 32 for the object slide are disposed as illustrated in the parts 34a which provide the opposite side walls 34 of the housing. The parts 42a and 42b of the blank which form the top wall 42 of the housing are provided with slits 42c and 42d, respectively, which are in alignment with each other when the blank is folded into box form and constitute passages for the passage or exhaust of heat generated by the lamp 18. Blank 12a is provided with a tab 44 which is to be secured, as by pasting or in any other way, to the inner surface of rear wall forming portion 46a. Bottom portions 14a, 14b and 14c are secured by paste or other suitable means to form the bottom, portion 14b being preferably disposed innermost and secured to part 14c. Part 46b is secured to the inner surface of part 14c. Parts 42b and 48a form closure flaps at the front and rear, respectively, of the housing top and part 42a is provided with a flap 42e which is disposed inwardly of the housing when the top thereof is in folded and closed position. Top 42a is preferably unsecured except at its line of fold with adjacent side wall forming part 34a, and provides a releasable cover to permit access to the interior of the projector housing. Tab 42e is provided with a slit 32a which registers with the upper end portion of one of the slits 32 and the adjacent side wall 34 of the housing when the cover is in closed position.

Thus it is seen that the optical projector herein shown or described is well adapted to accomplish the several objects of the invention. It will be understood that the parts can be supplied in knock-down or non-assembled relation to be assembled by the child or other user for constructing the projector. Also, as hereinbefore stated, the object slides can be made up very easily at little or no cost by cutting appropriate strip material from newspapers, magazines, or other sources. The operation of the projector is likewise a simple matter as it is merely necessary to move the slide through the housing and to focus the image from the slide on a screen or wall or other suitable light reflecting surface.

While we have shown and described the preferred embodiment of the invention it will be understood that the latter may be embodied otherwise than as here shown and that in the form of the invention herein shown or described certain changes in the details of construction and in the arrangement of parts may be made. Therefore, we do not wish to be limited to the invention as herein specifically shown or described except to the extent which may be required by the scope of the appended claims.

Having thus described our invention, what we claim and desire to secure by Letters Patent is:

1. An optical projector comprising a housing formed from a blank of sheet material and comprising walls having provision for mounting a source of light therein and for mounting a lens for the projection therethrough of light from said housing, said housing comprising opposite side walls provided with slots therein between the opposite ends thereof for guiding an object slide for movement in relation to said source of light and lens whereby light from said source is reflected by said slide through said lens.

2. An optical projector comprising a housing formed from a blank of sheet material and having provision for mounting a source of light therein and for mounting a lens for the projection therethrough of light from said housing, said housing comprising in integral relation opposed end walls and opposed side walls, said opposed side walls having slots or the like therein between the opposite ends thereof for the passage therethrough of an object slide for movement in relationship to said source of light and lens said lens mounting comprising one of said end walls of the housing having an opening therethrough, a tube containing said lens projecting axially through said opening in engagement with said end wall at the edge thereof which defines said opening, said lens tube being held in position by said engagement thereof with said wall.

3. An optical projector comprising a housing having provision for mounting a source of light therein and for mounting a lens for the projection therethrough of light from said housing, said mounting for the source of light comprising a wall of the housing formed of overlapping foldably related parts having aligned openings therethrough, and a lamp socket projecting through said openings in engagement with said parts at the edges thereof which define said openings, said parts being held in folded relation by said lamp socket.

4. An optical projector comprising a housing having provision for mounting a source of light therein and for mounting a lens for the projection therethrough of light from said housing, said mounting for the source of light comprising a plurality of foldably related parts of the housing, said parts having openings therethrough and a lamp socket projecting through said openings in engagement with said wall parts at the edges thereof which define said openings, said lens mounting comprising a wall of the housing having an opening therethrough, a tube containing said lens projecting axially through said opening in engagement with said wall at the edge thereof which defines said opening.

5. An optical projector comprising a housing having provision for mounting a source of light therein and for mounting a lens for the projection therethrough of light from said housing, said mounting for the source of light comprising a plurality of foldably related parts of the housing, said parts having openings therethrough and a lamp socket projecting through said openings in engagement with said wall parts at the edges thereof which define said openings, said housing also having means for guiding an object slide for movement in relation to said source of light and lens whereby light from said source is reflected by said slide through said lens, said slide-guiding means comprising opposite integral wall portions of the housing having slots therein for the passage of the slide.

VICTOR S. FOX.
ROBERT W. FARRELL.